(12) United States Patent
Brody (10) Patent No.: US 11,004,645 B2
(45) Date of Patent: May 11, 2021

(54) DISPLAY ASSEMBLY WITH ANTI-REFLECTIVE FILM APPLIED TO VIDEO MONITOR WITH VACUUM SUCTION

(71) Applicant: DISNEY ENTERPRISES, INC., Burbank, CA (US)

(72) Inventor: Barton Robert Brody, Newhall, CA (US)

(73) Assignee: Disney Enterprises, inc., Burbank, CA (US)

( * ) Notice: Subject to any disclaimer, the term of this patent is extended or adjusted under 35 U.S.C. 154(b) by 26 days.

(21) Appl. No.: 16/521,675

(22) Filed: Jul. 25, 2019

(65) Prior Publication Data

US 2021/0027971 A1 Jan. 28, 2021

(51) Int. Cl.
*H01J 29/89* (2006.01)
*G02B 1/11* (2015.01)
*G06F 3/14* (2006.01)

(52) U.S. Cl.
CPC .............. *H01J 29/896* (2013.01); *G02B 1/11* (2013.01); *G06F 3/1446* (2013.01)

(58) Field of Classification Search
CPC ......... G02B 1/11; G06F 3/1446; H01J 29/896
See application file for complete search history.

(56) References Cited

U.S. PATENT DOCUMENTS

| 2007/0153138 A1* | 7/2007 | Levy | G03B 21/56 348/825 |
| 2012/0162577 A1* | 6/2012 | Kuromizu | G02F 1/133604 349/70 |

* cited by examiner

*Primary Examiner* — Anne M Hines
(74) *Attorney, Agent, or Firm* — Snell & Wilmer L.L.P.; Kent A. Lembke (57) ABSTRACT

A display system achieving a screen finish using vacuum suction. The system includes an optical element with an exterior surface, and an optical film is positioned over the exterior surface. The optical film is formed of a flexible optical material such as an anti-reflective material. The display system includes a retention frame supporting the optical element and retaining outer edges of the optical film against the exterior surface. The display system includes a vacuum unit in fluidic communication with a gap between the inner side of the optical film and the exterior surface of the optical element. The vacuum unit operates to pump gas out of the gap to draw a vacuum on the gap and may be operated on an ongoing basis to retain this vacuum. The optical element may be a video monitor, with the exterior surface being the display screen.

26 Claims, 6 Drawing Sheets

DISPLAY ASSEMBLY WITH ANTI-REFLECTIVE FILM APPLIED TO VIDEO MONITOR WITH VACUUM SUCTION

BACKGROUND

1. Field of the Description

The present description relates, in general, to electronic display devices including those using monitors (such as liquid crystal display (LCD) monitors, organic light emitting diode (OLED) TVs, and so on) to provide digital still or video content to an audience, people passing by a display, and other viewers/observers. More particularly, the description relates to a display assembly or system configured to more effectively and efficiently apply, and retain in place, an optical film such as an anti-reflective film to an optical element, e.g., to an exterior surface of a screen of a monitor or similar display device.

2. Relevant Background

There is a growing demand for new and exciting designs for optical systems used to display still and video content to audiences located in very dark theaters or rooms or that may be in higher light settings such as outdoors. These optical systems often may use display technologies such as LCDs, OLED TVs, or other display devices to present video content in a wide variety of settings. Typically, it is desirable to generate a picture of the highest quality for a particular application (or its lighting levels, types of lighting that may change over time, and so on), and it may also be desirable to provide the display device such that its monitor or monitor screen is not readily apparent to the observer (e.g., to have the displayed content appear to be visible through a window or viewing port). In other cases, a display or optical system designer may wish to use the display device to generate unique visual effects by overlaying graphical content over the monitor's screen or by providing an optical element such as a polarizing film between the viewer and the display device.

System designers may prefer to use commercial off-the-shelf display devices in park and other facility attractions, in shows, and for menu boards and other digital signage. This is because these display devices, such as an LCD monitor, are less expensive than a custom device, have warranties, and are easier to maintain and to obtain replacements when necessary. One downside, though, with using off-the-shelf displays is that they often will not have the screen finish desired for a particular application. For example, a display may be planned for a very low light setting, and an anti-reflection screen finish may be needed to avoid distracting reflected imagery. In addition to an anti-reflection screen finish, other applications may be enhanced through the use of custom printed graphic finishes, patterned front-projection finishes, and/or environmental protection finishes to protect the screen from water, Sun damage, fingerprints, scratches, and/or other hazards in a particular environment.

Unfortunately, to date, obtaining a desired screen finish on a display element has proven difficult to achieve, and this problem is often exacerbated when the display device is quite large (e.g., television monitors are now available in the range of 65 to 90 inches or more) and/or expensive (e.g., many higher quality monitors cost $5 to $60K USD or more). Screen finishes, such as those obtained using an anti-reflective film, have typically been accomplished using films that are adhered to the monitor's screen in a permanent manner by lamination with adhesives, bonded coatings, or other techniques. This permanently alters the display device as it cannot be removed, replaced, or refurbished without damaging the screen's exterior surface. Such an approach is undesirable also because the display device with the screen finish-providing film cannot be easily repurposed to have any other screen finish to allow its use in another display system or environment. Some attempts have been made to apply anti-reflective or other films using light adhesives or liquid bonding agents, but these attempts typically are not acceptable due to distorting of the optical features of the displays with wrinkles, bubbles, and artifacts presented in the film itself, in the adhesive/bonding layer, and/or in optical interfaces between these various layers.

Hence, there remains a need for a new technique for providing a desired screen finish on a display device such as an LCD, OLED, or similar display device or monitor. Preferably, the new technique would not require a permanent or nearly permanent alteration of the display device or monitor while still being effective in achieving a desired screen finish with minimal or even without distortion of optical features of the display device or monitor.

SUMMARY

In brief, a display system or assembly is provided that is specially adapted to achieve a desired screen finish to an optical element such as, but not limited to, a display device or monitor. The new display system achieves this functionality by applying an optical film or sheet of flexible optical material (e.g., anti-reflective film) to an exterior surface of the optical element, such as an exterior or front surface of a screen of a display device/monitor, using vacuum suction.

To this end, a retention frame is used to physically position the optical film proximate to the exterior surface of the optical element, with a guard element pressing the edges of the optical film against the exterior edges of the optical element. One or more connectors, each with an inner passageway or lumen, are provided in the frame each with a fluid inlet coupled, through an opening or aperture in the optical film (e.g., a cut or formed hole), to the gap or space between an inner (or screen-facing) side of the optical film and the exterior surface of the screen of the display device/monitor. For example, a port element or connector may be provided in each corner of a rectangular frame to provide four vacuum-drawing locations.

The system further includes a vacuum unit with its gas intake fluidically coupled to a fluid outlet of each of the connectors via a hose or tube (with tubes being manifolded together prior to the intake when more than one is present). The vacuum unit is operated, e.g., on an ongoing basis to account for potential leakage, to draw a vacuum on the gap or space by drawing air or other gas through its intake and ejecting the air or gas through its exhaust. As the air is removed from the gap or space, the vacuum suction draws or forcibly pulls the inner side of the optical film toward the exterior surface of the screen of the display device/monitor so as to achieve an often near perfect mating or continuous abutting contact between the optical film and the screen's surface as all or nearly all the air is removed from the gap or space (e.g., the gap or space is closed or its size minimized to be zero or nearly zero). The display system allows rapid repurposing as the vacuum can be dropped by powering down the vacuum unit, and the frame can be loosened or partially disassembled to allow removal and replacement of the optical element to achieve a newly desired optical effect with no permanent effects or damage to the exterior surface of the screen of the display device/monitor.

More particularly, a display system is provided that is adapted to achieve a screen finish on one or more surfaces in a non-permanent and/or selectable manner. The system includes an optical element with an exterior surface, and an optical film is positioned over the exterior surface. The optical film is formed of a sheet of flexible optical material such as an anti-reflective film (e.g., a sheet of rear projection (RP) screen material or the like). The display system further includes a retention frame supporting the optical element and retaining outer edges of the optical film against the exterior surface with an inner side of the optical film facing the exterior surface. Significantly, the display system also includes a vacuum unit in fluidic communication with a gap between the inner side of the optical film and the exterior surface of the optical element. During system operations, the vacuum unit operates to pump gas out of the gap to draw a vacuum on the gap.

In some embodiments of the system, the optical element takes the form of a video monitor, and the exterior surface is the surface of a display screen of the video monitor (e.g., a liquid crystal display (LCD) television, an organic light emitting diode (OLED) television, or the like). In the same or other embodiments, the vacuum unit is first operated to draw the vacuum on the gap such that vacuum suction pulls the inner side of the optical film into contact with the exterior surface in a substantially uniform and continuous manner across the exterior surface and then the vacuum unit is second operated on an ongoing basis to retain the vacuum on the gap.

In some implementations, the retention frame includes a port or connector providing a fluid passageway to the gap, and the vacuum unit comprises a vacuum pump with an intake coupled to the port in the retention frame. In such implementations, the retention frame further may include at least three additional ports spaced apart from the port (e.g., at each corner of a rectangular or other-shaped frame), and each provides a fluid passageway to the gap. The intake of the vacuum pump is coupled to the at least three additional ports to provide suction on the gap at four or more spaced apart locations. The optical film may include an aperture extending from the inner side to an outer side (or through its thickness), and the port/connector may extend through the aperture with a substantially airtight seal being provided about a periphery of the aperture.

In some embodiments, the retention frame further includes a plurality of elongated guards applying an additional retention force to an outer side of the optical film opposite the inner side along and adjacent to the outer edges retained by the retention frame. With the use of the guards, when the vacuum unit is not operating to provide the vacuum on the gap, the elongated guards act to apply a force that pushes the inner side of the optical film against the exterior surface of the optical element to retain the selectable screen finish.

In the same or other embodiments, the retention frame is configured for disassembly to release the optical film and to facilitate replacement of the optical film with a second optical film. In such cases, the gap between the inner side of the optical film and the exterior surface of the optical element is free of adhesives, whereby the optical film is only physically mated with the optical element in an impermanent manner. In these and other embodiments, the retention frame includes a rear retention member and a front retention member, and the optical element and the optical film are sandwiched between the rear and front retention members. In such cases, the retention frame further may include a sealing member formed of resilient material that is positioned between the inner side of the optical film proximate adjacent the outer edges and the exterior surface of the optical element, and the sealing member is compressed from an at rest state to block flow of gas into the gap from the surrounding environment.

DETAILED DESCRIPTION

Briefly, a display system or assembly is provided that applies an optical film or sheet of flexible optical material to a surface of an optical element. The system includes a retention frame for physically applying and retaining the optical film in a stretched manner over the surface of the optical element with an inner surface (or side) of the optical film abutting or nearly abutting the surface of the optical element. The system includes a vacuum unit that has its intake fluidically coupled to a gap or space between the inner surface of the optical film and the surface of the optical element. During operations of the display system or assembly, the vacuum unit can be run periodically or, more preferably, continuously to pump all or nearly all the air out of the gap or space or to draw a vacuum on this space/gap. The resulting vacuum suction draws or forcibly pulls the optical film onto the surface of the optical film, whereby the inner surface of the optical film abuts or contacts the surface of the optical element in a continuous or nearly continuous manner so that no (or minimal) distorting effects are created while the optical film provides a desired screen finish for the optical element.

To better understand the need for and driving force behind the new display system, it may be useful to describe one problem addressed by and one application for the new display system. In a planned display or attraction, the audience or viewers will look out a clear acrylic hemispherical porthole or window of a vehicle into space and/or surrounding environments. The media or imagery the audience views through the porthole or window will be run or provided on a 100-inch video monitor. In prototyping, a problem was encountered because the clear hemisphere porthole or window reflects the image playing on the monitor back onto the monitor. This produces double and ghosting images that the audience would be able to see. The display system designers determined it would be useful to use a rear projection (RP) screen material (or an RP screen) as an anti-reflective coating (e.g., as the optical film over the exterior surface of the display device or monitor). In prior display systems, the RP screen would likely have been glued or otherwise attached to the monitor.

However, to apply or adhere an anti-reflective projection film to a 100-inch video monitor, it was recognized by the inventor that gluing would be very risky and an unappealing fabrication choice. For example, if the RP screen (or another optical film) were permanently applied to the monitor, it would void any manufacturer's warranty. Further, the glue is often activated by water, much like a window film, and it is likely that the water would seep into the monitor and possibly ruin its electronics. To address this issue, it was proposed that if enough area was left clear of the bezel or outer edge of the exterior surface of the monitor that the water seepage risk would be reduced, but this would result in the viewing image size being reduced, which often is unacceptable to a display system designer. To address these and other problems, the inventor created the new display system design that builds on the novel idea of using a vacuum pump to hold the anti-reflective film to the monitor without damaging the monitor. Additionally, if the anti-reflective film is ever damaged, it can be readily replaced without any negative impact on the monitor.

Figure 1:
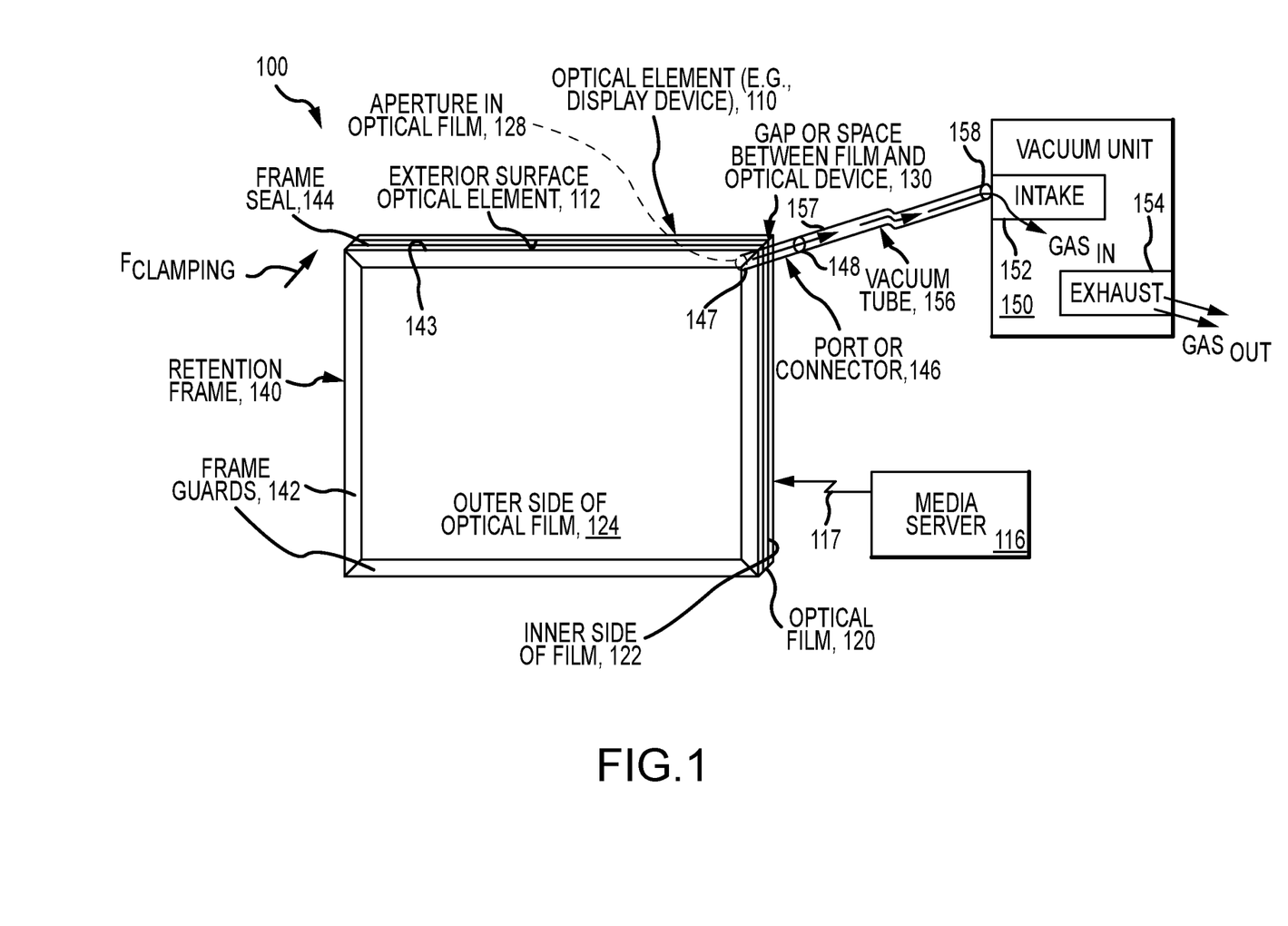
FIG. 1 illustrates a functional block or schematic diagram of a display system using vacuum suction to apply a screen finish to a surface of an optical element according to the present description.

FIG. 1 illustrates a functional block or schematic diagram of a display system 100 using vacuum suction to apply a screen finish to a surface 112 of an optical element 110 according to the present description. The display system 100 may be used in any setting or application in which it is desirable to use an optical element 110 to provide a desired optical effect, which is enhanced by applying a particular screen finish to the optical element and that which typically is not available when the optical device 110 is a commercial off-the-shelf device. The optical element 110, for example, may be an optical product that allows viewing of a space on an opposite side (e.g., a window, a lens, or the like) or of the space in which it is facing (e.g., a reflective product or mirror).

In other cases, the optical element 110 is used to display still or video imagery via its exterior surface 112, and, in such cases, the optical element 110 may be a display element or monitor (as these terms may be used similarly or interchangeably herein) such as an LCD or OLED television (TV) or monitor, with the exterior surface 112 being a surface of its display screen. The display system 100 may further include a media server or content source 116 communicatively coupled as shown with arrow 117, and the media server 116 is operable to selectively provide still or video content (e.g., digital video clips or movies) to the optical element 110 when it is operating to display images on or via the exterior or screen surface 112. The system 100 is particularly well suited for use with optical elements 110 that are large (e.g., 60 to 90 inches or more is a common size for the optical element when it takes the form of a commercial video monitor), expensive, and/or reusable (e.g., devices for which it is desirable to be able to remove the screen finish for replacement or due to damage or wear and tear of its surfaces/body).

To provide a desired screen finish for the surface 112, the display system 100 includes an optical film 120 that is sized and shaped to match that of the exterior surface 112. For example, the optical film 120 is some amount larger to ensure all areas are covered and to mate along its edges with the frame 140. The optical film 120 may take the form of nearly any flexible optical material useful in providing a screen finish to the optical element 110 such as an anti-reflective film (e.g., RP screen material or the like), a polarizing film, a film with graphical content, a color providing film, and so on. The thickness may also vary with greater thicknesses supported by the system 100 design than those using adhesive as heavier films may be utilized (e.g., a film thickness of up to 0.25 inches or more is acceptable). The film 120 is "flexible" in that it is typically formed of a non-rigid material such as a plastic or the like so that it can be stretched taut by the frame 140 and so it can be flexed inward toward the surface 112 when a vacuum suction or vacuum force is applied to it as discussed below.

The optical film 120 has an inner side 122, and the film 120 is oriented (e.g., to be parallel to and physically overlay the surface 112) to position in the inner side to face or be proximate to the exterior surface 112 of the optical element 110. The film 120 further includes an outer or exterior side 124 that faces away from the optical element 110 and provides the screen finish to the exterior surface 112 of the optical element 110. It is desired, to avoid distortion or other optical artifacts, for the inner side 122 of the film 120 to continuously abut or physically contact/mate with the exterior surface 112, but, upon initial assembly of the display system 100, there is a gap or space 130 between the inner side 122 and the exterior surface 112 that contains some air or gas (e.g., air bubbles or the like even when the film 120 is physically pressed against the optical element 110). Prior to use of the display system 100 for its end use, though, the display system 100 is operated to remove this air or gas to close (or even eliminate) the gap or space 130 (e.g., make the gap distance substantially zero across the exterior surface 112).

The display system 100 includes a retention frame 140 that functions to physically force the edges of the optical film 120 against the outer edges or bezel of the optical element 110 so as to allow the optical film 120 to wholly cover the exterior surface 112 (e.g., display or monitor screen surface). The frame 140 also provides a nearly airtight seal between the inner side 122 of the film 120 and the exterior surface 112 and to the gap/space 130 between the film 120 and optical element 110. The frame 140 also provides a fluidic connection to the gap/space 130 allowing use of a vacuum unit 150 to draw a vacuum on the gap/space 130. The frame 140 also functions to adequately retain the film 120 in place upon loss of the vacuum unit 150 (after its operation to remove air/gas) such that screen finish is retained or at least partially retained for a period of time so that a "B" or typically acceptable optical effect (e.g., viewing of a video on optical element 110) can be provided through use of the display system 100 (e.g., for a time period while the vacuum unit is repaired or replaced).

To these ends, the retention frame 140 includes a set of outer retention members (not shown) that mate with outer edges of the optical film 120 and physically hold through clamping forces, $F_{Clamping}$, the outer edges of the film 120 in abutting contact with the outer edges of the optical element 110 extending adjacent the exterior surface 112 (e.g., a bezel of a video monitor). Further, as shown, frame guards 142 are provided in the frame 140 that are configured for applying additional inward forces on the very outer edges of the optical film 120 (e.g., with an inner surface 143 of the guards 142, upon the outer side 124 of the film 124 when the fasteners of the frame 140 are tightened) to move and hold the inner side 122 of the film 120 beneath the frame guards 142 in abutting contact with the exterior surface 112 of the optical element 112 along the lengths of guards 142. The guards 142 are useful, in part, in retaining the "B" show quality of the screen finish upon loss of the vacuum provided by vacuum unit 150. A frame seal member 144, which may be formed of a resilient material such as a rubber, may be provided that extends under the outer retention members of the frame 140 between the frame 140 and the optical film 120 to provide a more airtight seal upon assembly of the frame 140 to apply the clamping forces, $F_{Clamping}$, along the lengths of the outer retention members of the retention frame 140.

As discussed above, vacuum suction is used in display systems of the present description to achieve a high quality screen finish. In this regard, the display system 100 includes a vacuum unit 150 with a gas intake 152 and a gas exhaust 154, and the vacuum unit 150 may be nearly any useful vacuum pump (or pump operable to pump gas) to practice the system 100. Larger capacity units may be useful for more rapidly achieving a vacuum, but these may be too large in some applications or may require too much power or be noisy. Hence, some embodiments of the display system 100 may use relatively low capacity vacuum pumps for unit 150 with it being acceptable that obtaining vacuum on the gap 130 may take a relatively long time upon initial set up or operation of system 100 (e.g., 15 to 30 minutes for a small vacuum pump) as such units are small in size and often are quiet in their operations. Such low noise operations are desirable in many settings as the vacuum unit 150 may be run on an ongoing basis to retain the vacuum to maintain the screen finish as leakage is possible or even likely in system 100 so that gas or air may reenter the gap 130 if the vacuum unit 150 is not run in a continuous or nearly continuous manner during use of the system 100 to provide a desired optical effect.

As shown, a fluid path is provided between the gap 130 and the vacuum unit 150 (i.e., the vacuum unit's intake 152 is in fluidic communication with the gap 130). Specifically, a port or connector 146 is provided in the frame 140 that is fluidically coupled to an aperture or opening 128 in the optical film 120 (e.g., a circular hole is cut or formed in the film 120), and, preferably, the connector or port 146 is coupled to the film 120 so as to provide an airtight (or nearly so) seal between contacting surfaces/components. The port or connector 146 includes an inner passageway or lumen in its body so that an inlet at a first end 147 provides an opening from the gap/space 130 to the inner passageway or lumen. An outlet at a second end 148 is also open to the inner passageway or lumen in the body of the connector/port 146, and a tube (or hose or line) 156 is coupled at its first end 157 to the second end 148 of the port/connector 146. The second end 158 of the tube 156 is coupled to the gas intake 152 of the vacuum unit 150 such that the vacuum unit 150 is in fluidic communication with the gap or space 130 between the film 120 and the exterior surface 112 of the optical element 110. Note, one connector/port 146 is shown as a minimum, but the system 100 could include two (e.g., at opposite corners or sides), three, four (e.g., one at each corner), or more in some designs.

During operations of the display system 100, the vacuum unit 150 is run for an initial setup time period (e.g., several minutes to 30 minutes or more depending on unit capacity) to draw all or nearly all of the air or gas from the gap 130 and achieve a vacuum (e.g., a negative pressure on gap 130 with even a small vacuum pressure typically being adequate). This is shown with arrows in tube 156 showing gas or air flow from the gap 130 via aperture 128, port/connector 146, and tubing 156 into the unit 150 (shown as $Gas_{In}$ in FIG. 1) and then with gas or air (shown as $Gas_{Out}$) being pumped out of the unit 150 via the exhaust 154. In some embodiments, the vacuum unit 150 may be run only periodically after vacuum is achieved such as in response to control signals from a controller (not shown) while other embodiments may be operated as always "ON" or running so as to retain the highest quality screen finish for the optical element 110.

Figure 2A:
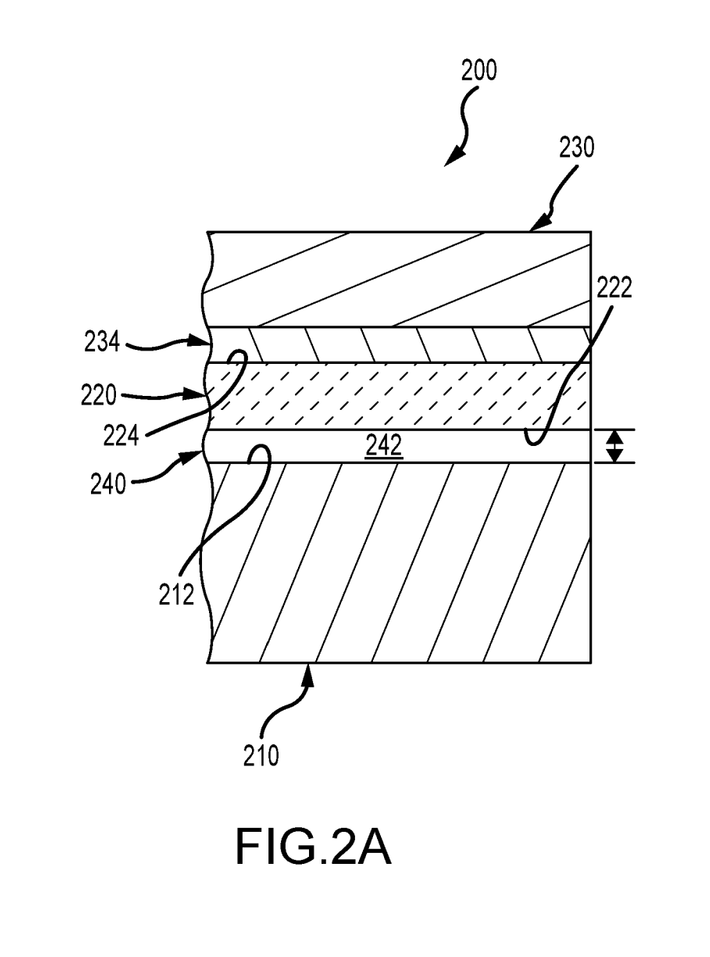
FIGS. 2A and 2B are partial sectional views of one edge of the stacked components of a display system before and after a vacuum is drawn by a vacuum unit, respectively.
Figure 2B:
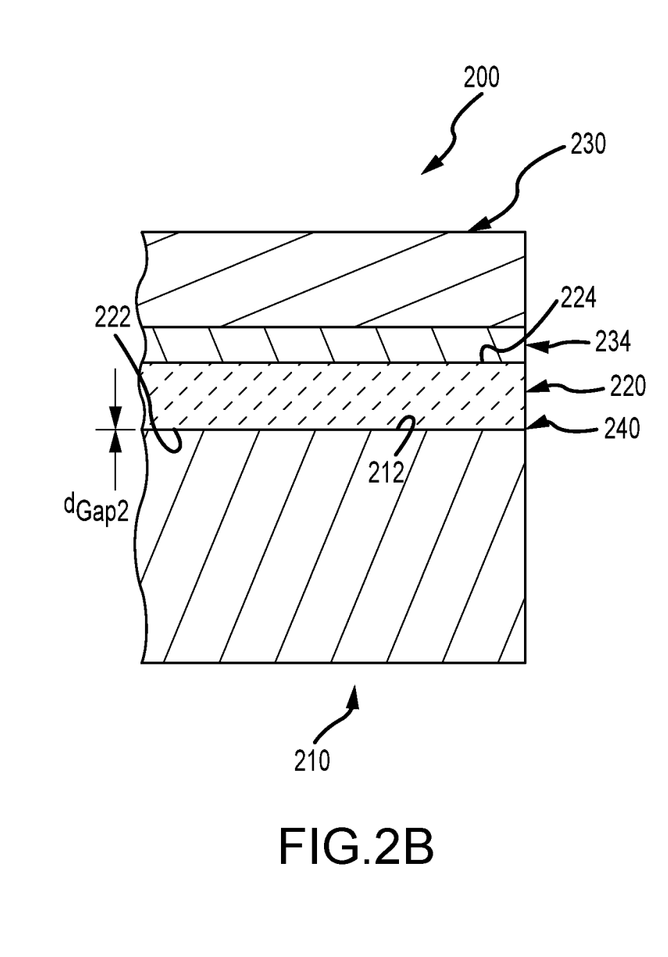

FIGS. 2A and 2B illustrate a side sectional view of an edge of an optical stack of a display system of the present description (e.g., of a portion of the retention frame, the optical element, and the optical film of FIG. 1). FIG. 2A illustrates the optical stack prior to application of the vacuum to the gap 240 but with the frame tightened/assembled to provide a clamping or retention force, and FIG. 2B illustrates the optical stack after the vacuum is achieved.

As shown, the optical stack includes an optical element 210 with an exterior surface 212 (e.g., a screen surface, a bezel of a monitor, or the like). A retention member 230 of a frame is used to apply a retention or clamping force via a resilient sealing member 234 onto an outer side 224 of an optical film 220. This causes an inner side 222 of the optical film 220 to be pressed into or toward abutting or mating contact with the exterior surface 212 of the optical element. However, as shown in FIG. 2A, the gap or space 240 between the optical element 210 and the optical film 220 may include air or gas 242 that can cause the separation distance or gap size, $d_{Gap1}$, to be some non-zero value (or at least in portions of the stack where there may be an air or gas bubble and the gap 240 will not have a uniform size, $d_{Gap1}$, across the surface 212).

In FIG. 2B, a vacuum unit (as shown in FIG. 1) has been used to draw the air or gas 242 from the gap 240 or to apply a vacuum on the gap 240. As a result, the inner side 222 of the optical film 220 (e.g., a sheet of RP screen material) mates in a seamless or nearly seamless manner (e.g., with intimate abutting contact across the entire surface area of the film 220 where it overlays the surface 212) with the surface 212 of the optical element (e.g., a video monitor or the like). Stated differently and as shown, the separation distance or gap size, $d_{Gap\ 2}$, is now zero or substantially zero over the entire (or nearly entire) surface 212 of the optical element 210 so there are no or minimal optical artifacts at the interface between the film 220 and the surface 212 of the optical element 210.

Figure 3:
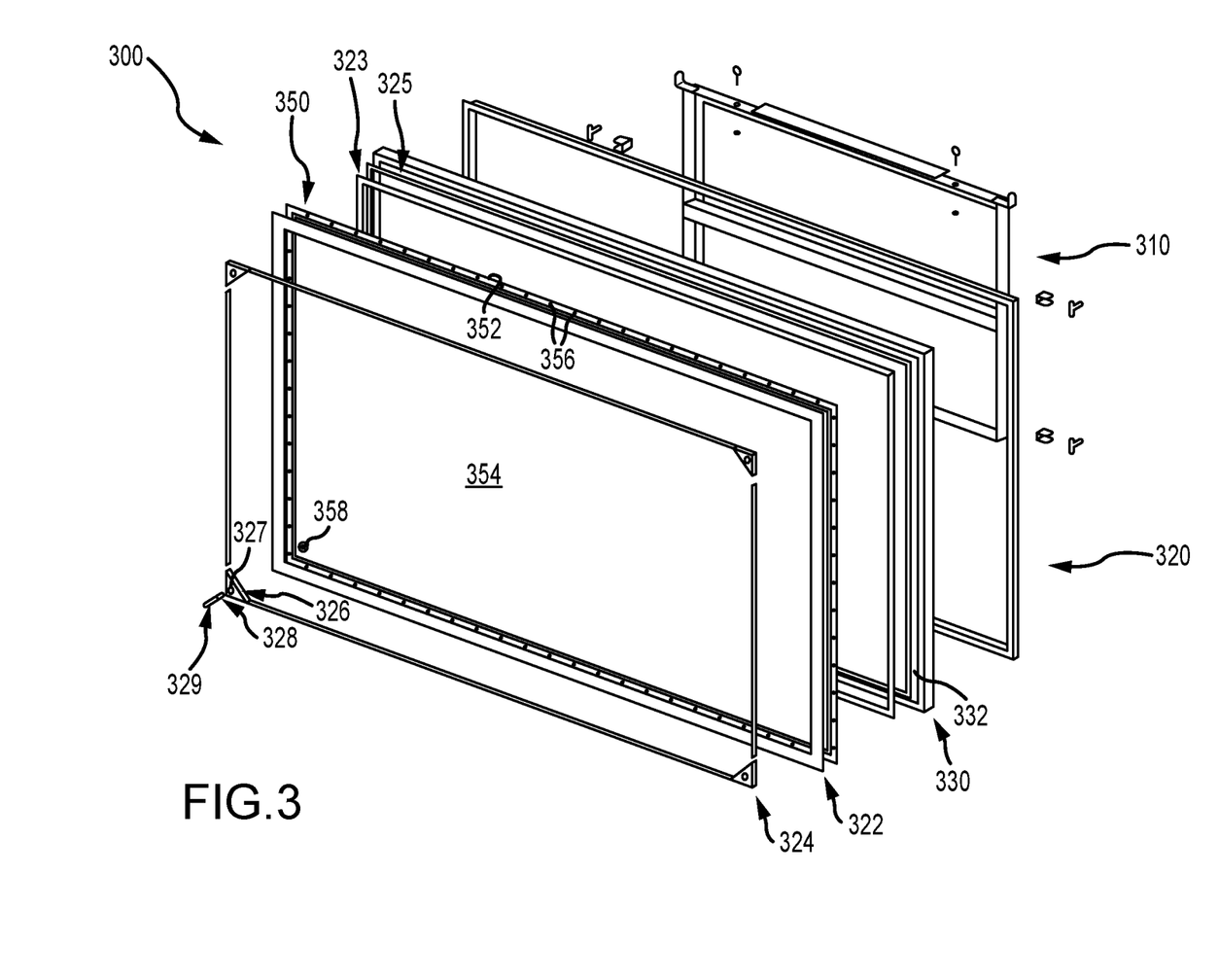
FIG. 3 is an exploded front perspective view of a portion of a display system of the present description (e.g., vacuum unit not shown but understood from FIGS. 1-2B)

With this general understanding of the use of vacuum suction to achieve a screen finish in hand, it may now be useful to describe one particular design of a display system (or its optical stack) 300. FIG. 3 shows an exploded view of the display system 300 or prior to assembly of the optical stack (with a vacuum unit not being shown but understood from FIG. 1). As shown, the display system 300 includes a mounting bracket 310 adapted to allow the optical stack (e.g., a monitor with a desired screen finish) to be mounted upon a wall or within a display frame/structure (not shown). The system 300 further includes a retention frame in the form of a rear bracket or rear retention member 320 (e.g., a rectangular shaped framing element with four elongate side members) and a front bracket or front retention member 322. These two retention members 320 and 322 can be coupled together with fasteners (as shown) that when tightened provide a clamping force to surfaces of objects positioned between them such as the outer edges of an optical element and an optical film.

The retention frame further includes frame guard assembly 324 (e.g., four elongate guard members as shown) that, when coupled with the front bracket or retention member 322 acts to apply a sealing or inward force along their lengths to the underlying optical film 350 (or the portion adjacent the outer edge held by member 322). A rubber seal 323 may be included as part of the retention frame to be disposed between the outer edges of the optical film 350 against inner side 352 and the outer edges or bezel of the optical element 330 (e.g., a video monitor). Two-sided tape 325 may be used to hold the seal or sealing member 323 in place during assembly of the system 300.

The display system 300 includes an optical element 330, such as a video monitor, with an exterior surface or surface of its screen 332. The system 300 also includes an optical film 350 such as an anti-reflective film (e.g., a sheet of RP screen material), and the film 350 is oriented in the optical stack to wholly overlay the surface 332 of monitor 330 with an inner side 352 facing the surface 332 and an outer side 354 facing away from the surface 332 (or outward from the optical stack). As shown, the outer edge (e.g., outer 0.5 to 1.0 inches) contains a series of spaced-apart holes. The frame's retention members 320 and 322 have similar hole patterns, and, when the stack is assembled, fasteners (as shown) extend through the holes in the retention members 320 and 322 as well as the holes 356 in the outer edges of the optical film 350 to better retain the film 350. The fasteners are then tightened to apply a desired clamping force upon the optical film 350 and seal or sealing member 323 to obtain an airtight (or nearly airtight) seal about the outer edges of the film 350. The rear bracket or retention member 320 is adapted for mating with the outer surfaces/sides of the optical element 330 so that its physically retained in the stack in a position with its surface 332 abutting or nearly abutting (except for any air gaps) the inner side 352 of the optical film 350.

To provide a fluid flow path to the space or gap between the inner side 352 of the film 350 and the exterior surface 332 of the optical element 330 (e.g., a video monitor), the system 300 is shown to include corner bezel or mounting member 326 in each corner of the guard 324 (when present or could be provided on framing member 322). The corner bezel member 326 has a planar body (shown triangular in shape but other shapes may be used), and an aperture or hole 327 which may be threaded is provided in the body of the member 326. This aperture 327 is used to receive a port or connector that, as shown, may take the form of a threaded pipe adapter and a pipe or tubing elbow.

Figure 6:
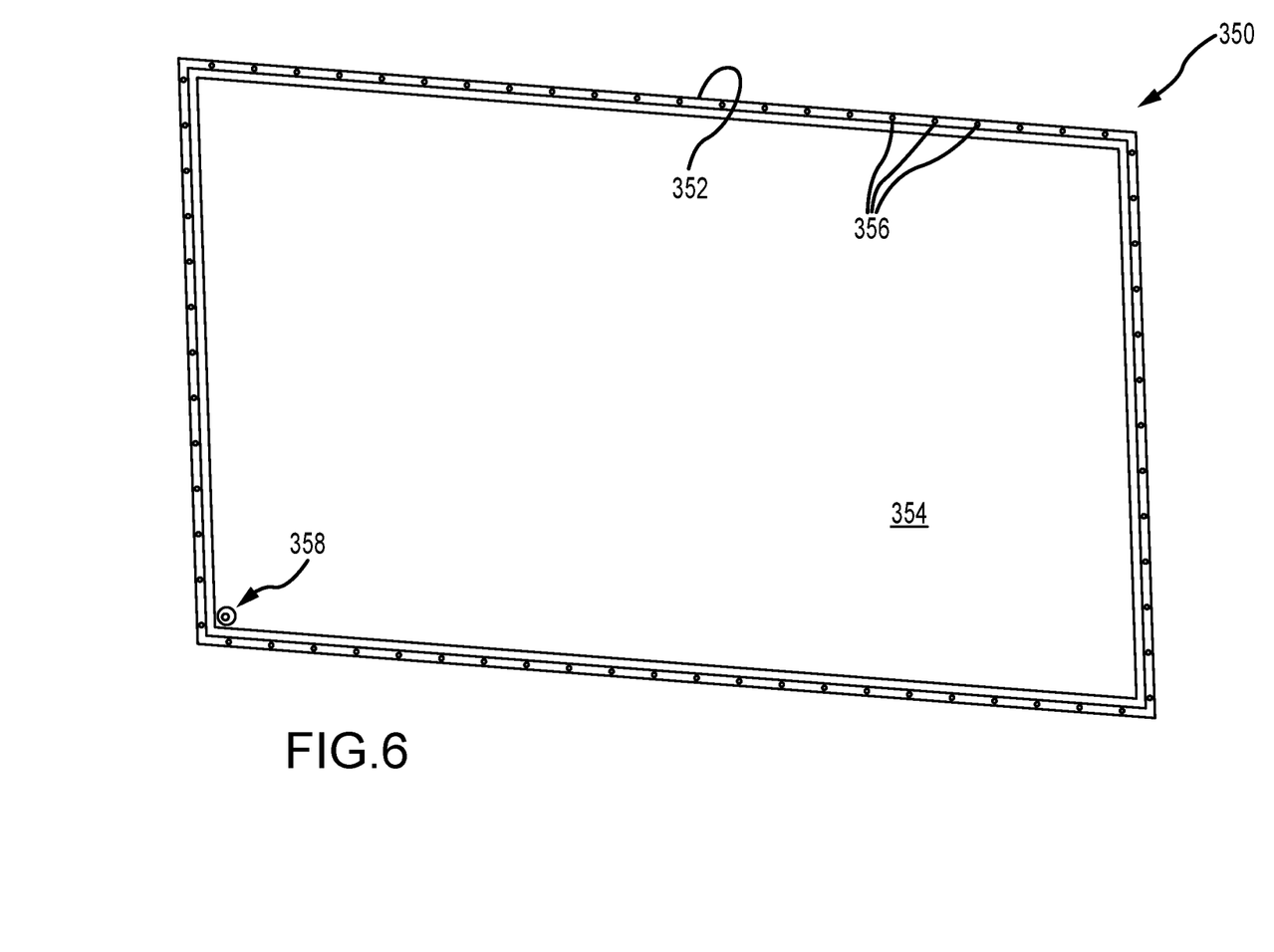
FIG. 6 is a front view of the sheet of flexible optical material or optical element that may be used in a display system of the present description.

The pipe adapter may extend through the hole 327 in the corner bezel member 326 and then through an aperture or hole 358 in a matching location in the optical film 350 so as to provide a fluidic coupling or fluid passageway or flow path to the gap or space between the inner side 352 of the film and the exterior surface 332 of the optical element 330. FIG. 6 illustrates the optical film 350 in isolation so as to more clearly show the aperture 358 and also to show the through holes 356 provided along the edge (e.g., along about 0.5 to 1.5 inches of each side of the sheet of material) of the film 350 to facilitate retention in place by the frame members 320 and 322. A similar configuration may be provided at each corner of the optical film 350 to provide four outlets of air or gas from this gap or space. An intake of a vacuum unit (not shown) may then be coupled via hose or tubing to each elbow 320, and it can be run to pump all or most of the air or gas out of the gap, i.e., to draw a vacuum on the space/interface. This causes the inner side 352 of the optical film 350 to be drawn tightly and continuously (or nearly so) into contact with the exterior surface 332 of the optical element 330 (e.g., to a surface of a screen of a video monitor).

Figure 4:
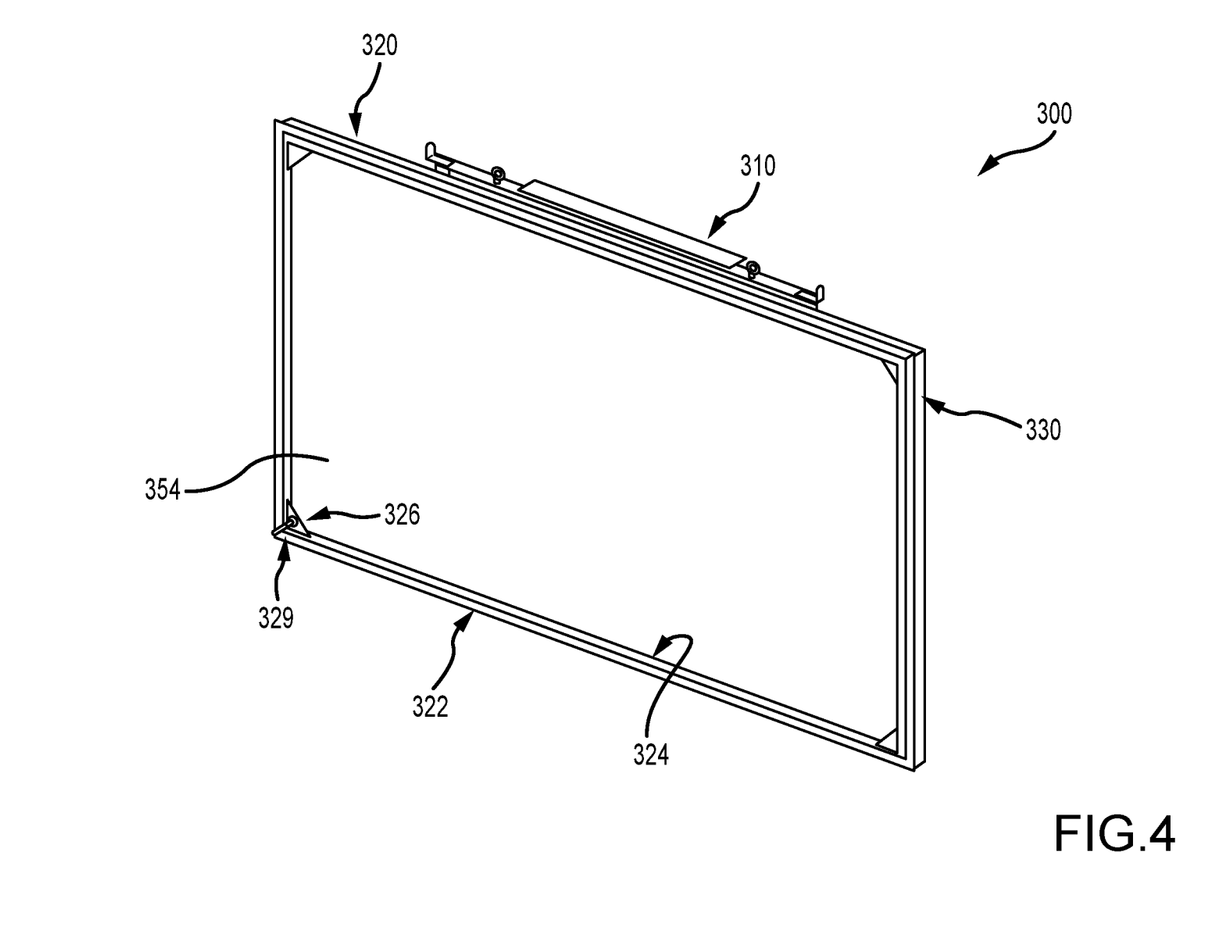
FIG. 4 is a front perspective view of the display system of FIG. 3 upon assembly.

FIG. 4 illustrates the display system 300 after it has been fully assembled but prior to connection of a vacuum unit to the connector or port provided by elbow 329 in corner bezel member 326, but FIG. 4 shows that access is provided by the design for ready connection of the vacuum unit. As shown, the rear and front retention members 320 and 322 hold the monitor 330 with its outer edge or bezel sandwiched between them. Further, the optical film 350 has been applied to the surface 332 with its outer side 354 shown visible in the assembled optical stack. Guard assembly 324 is applied so that elongated guard members apply an additional clamping or retention force upon the outer side 354 of the optical film 350 along its outer edges or portions immediately adjacent the inner sides of the front retention member 322. The guards 324 typically have a relatively small width (such as 0.25 to 0.5 inches or the like) so as to not cover a significant amount of the optical element's surface 332.

Figure 5:
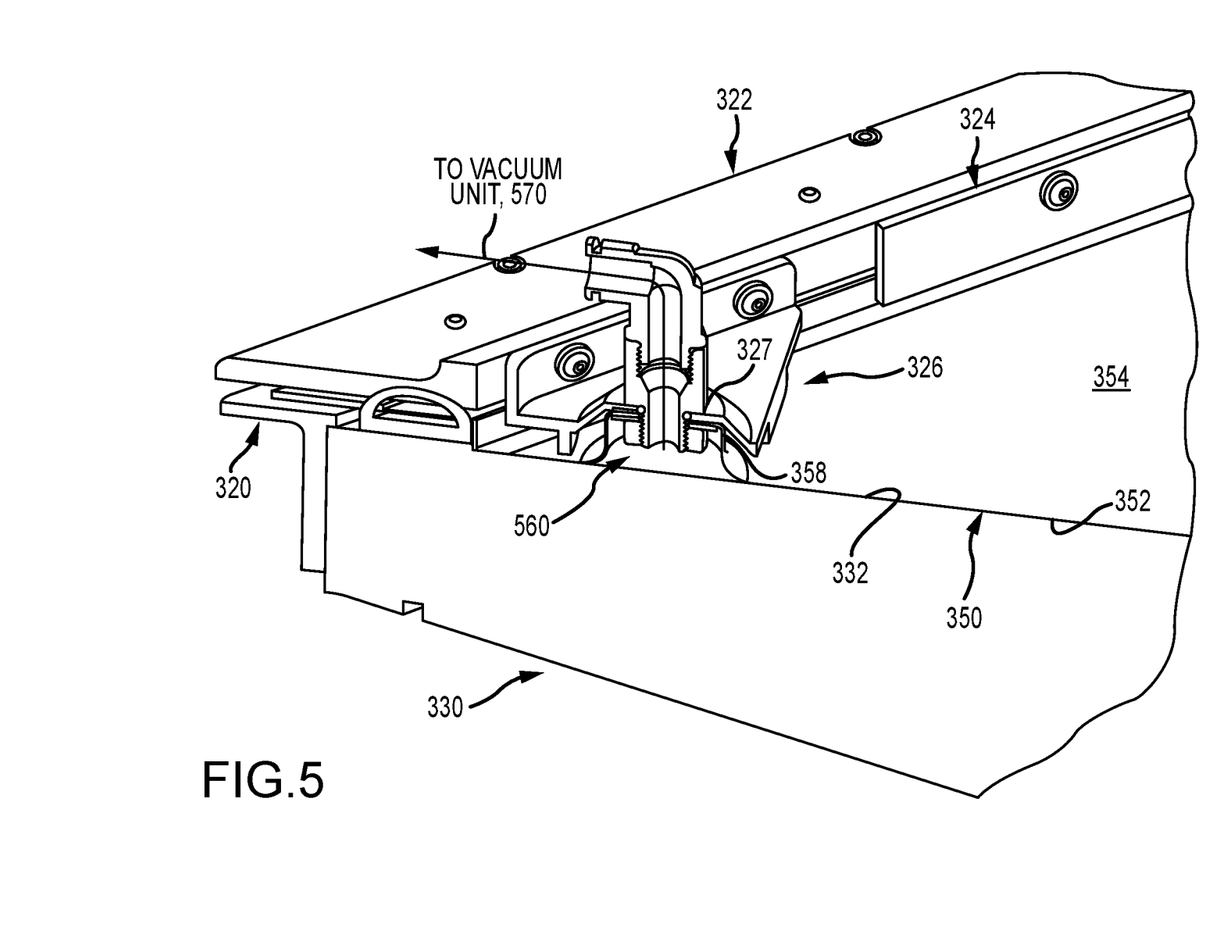
FIG. 5 is a partial sectional view of a corner of the display system of FIGS. 3 and 4 showing components providing a flow path to the space between the sheet of flexible optical material (e.g., RP screen material) and the surface of the screen of the monitor/display device.

FIG. 5 provides a cross sectional view of a corner of the assembled optical stack of the display system 300. It can be seen that the rear and front retention members 320, 322 of the frame hold the monitor 330 and also pinch or sandwich the outer edge of the optical film 350 between them. FIG. 5 is also useful for showing in more detail the fluid path to a gap or space 560 between the inner side 352 of the optical film 350 and an exterior surface 332 of the optical element 330. As shown, the corner bezel member 326 is fastened to the front retention member 322.

The pipe adapter 328 extends through the hole/aperture 327 in the body of the corner bezel member 326 as well as the aperture or opening 358 passing through the thickness of the optical film 350 (with a coupling nut threaded on the inner end of the pipe adapter 328 to provide a seal between the film 350 and the lower surfaces of the corner bezel member 326. Line 570 shows that this configuration provides (with the addition of a hose or tube) a flow path for any gas or air in the gap or space 560 (which is intended to represent the space or gap at the interface between side 352 of the optical film 350 and surface 332 of the optical element) to allow a vacuum unit coupled to the elbow 329 (or port or connector that it is a part of) to draw the air or gas out of the space 560 until the point where a vacuum is achieved.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

This description provides a method and system for affixing a screen finish onto any size or shape of display in an optically acceptable fashion while, at the same time, avoiding the use of permanent bonding adhesives or liquids. The screen finish layer or optical film is held in intimate contact with the native screen surface by a continuous vacuum and can be removed and replaced by simply turning off the vacuum. Intimate contact minimizes visual artifacts caused by interface layers of adhesive or gas. The new display system or assembly also allows the use of wider ranges of optical materials and material thicknesses because the optical film or screen finish layer is held in place mechanically rather than with adhesive. This makes the screen finish maintenance friendly as the optical film or screen finish layer can be replaced at low cost in case of damage or nominal wear and tear, and the use of the optical film protects the built-in screen or native screen surface from all sorts of damage and abuse that may occur in many public environments in which the display system may be used.

In one particular example, the optical film takes the form of an anti-reflective film, such as a sheet of RP screen material or RP film, that is applied to a large screen of a monitor or display device (e.g., a 100-inch OLED monitor). In this case, the RP film needs to be held tightly to the monitor surface. If this is not done properly, the image is soft and out of focus in areas. The RP film may be attached to a frame with snaps, and the frame is mechanically held to the monitor bezel or outer edges of the screen of the monitor/display device. Between the RP film and the bezel, a rubber air-tight seal can be applied. The frame further can have guards that gently press the RP screen film (or its outer edges) onto the exterior surface of the monitor or onto the monitor face. This allows for a tight corner to be created at the bezel/monitor face. There are one or more ports or connectors in one or more corners (or other locations) of the frame, and vacuum tubes, hoses, or lines are fluidically coupled to these ports/connectors to couple the gap/space between the RP film and the monitor face and the intake of the vacuum unit (e.g., a suction pump).

This system provides an "A" show and a "B" show (of lesser quality than the "A" show). The "A" show is provided when the vacuum unit operates to draw a vacuum at or on the gap/space to provide a clear and focused image through the RP film when the monitor is displaying still or video images/content. The "B" show is provided when the vacuum pump/unit fails at which point the guards of the frame hold the RP film (on a relatively short-term basis) in an acceptable position without the display system having to be shut down upon loss of the vacuum.

I claim:

1. A display system with a selectable screen finish, comprising:
   an optical element with an exterior surface;
   an optical film positioned over the exterior surface and formed of a sheet of flexible optical material;
   a retention frame supporting the optical element and retaining outer edges of the optical film against the exterior surface with an inner side of the optical film facing the exterior surface; and
   a vacuum unit in fluidic communication with a gap between the inner side of the optical film and the exterior surface of the optical element,
   wherein the vacuum unit operates to pump gas out of the gap to draw a vacuum on the gap, and
   wherein the vacuum unit is first operated to draw the vacuum on the gap such that vacuum suction pulls the inner side of the optical film into contact with the exterior surface in a substantially uniform and continuous manner across the exterior surface and wherein the vacuum unit is second operated on an ongoing basis to retain the vacuum on the gap.

2. The display system of claim 1, wherein the optical element comprises a video monitor and wherein the exterior surface includes a surface of a screen of the video monitor.

3. The display system of claim 2, wherein the flexible optical material comprises the sheet of flexible optical material comprises an anti-reflective film.

4. The display system of claim 3, wherein the anti-reflective film comprises a sheet of rear projection (RP) screen material.

5. The display system of claim 1, wherein the retention frame comprises a port providing a fluid passageway to the gap and wherein the vacuum unit comprises a vacuum pump with an intake coupled to the port in the retention frame.

6. The display system of claim 5, wherein the retention frame further comprises at least three additional ports spaced apart from the port and each providing a fluid passageway to the gap and wherein the intake of the vacuum pump is coupled to the at least three additional ports.

7. The display system of claim 5, wherein the optical film comprises an aperture extending from the inner side to an outer side and wherein the port extends through the aperture and a substantially airtight seal is provided about a periphery of the aperture.

8. The display system of claim 1, wherein the retention frame further comprises a plurality of elongated guards applying an additional retention force to an outer side of the optical film opposite the inner side along and adjacent to the outer edges retained by the retention frame, whereby when the vacuum unit is not operating to provide the vacuum on the gap the elongated guards force the inner side of the optical film against the exterior surface of the optical element to retain the selectable screen finish.

9. The display system of claim 1, wherein the retention frame is configured for disassembly to release the optical film and facilitate replacement of the optical film with a second optical film and wherein the gap between the inner side of the optical film and the exterior surface of the optical element is free of adhesives, whereby the optical film is only physically mated with the optical element in an impermanent manner.

10. The display system of claim 1, wherein the retention frame includes a rear retention member and a front retention member, wherein the optical element and the optical film are sandwiched between the rear and front retention members, wherein the retention frame further comprises a sealing member formed of resilient material that is positioned between inner side of the optical film proximate adjacent the outer edges and the exterior surface of the optical element, and wherein the sealing member is compressed from an at rest state to block flow of gas into the gap from the surrounding environment.

11. A display system with a changeable screen finish, comprising:
    a video monitor with a display screen;
    a sheet of flexible optical material with an inner side facing and extending over a surface of the display screen;
    an interface gap between the inner side of the sheet of flexible optical material and the surface of the display screen; and
    a vacuum pump with an intake coupled to the interface gap, wherein the vacuum pump is operated to pump air from the interface gap to initially achieve and then retain a vacuum on the interface gap during operations of the display system.

12. The display system of claim 11, wherein the flexible optical material is an anti-reflective film.

13. The display system of claim 12, wherein the anti-reflective film comprises a sheet of RP screen material.

14. The display system of claim 11, further comprising front and rear frame members, wherein the video monitor is sandwiched between the front and rear frame members, wherein the front frame member applies a force upon an outer edge of the sheet of flexible optical material to provide a seal about a periphery of the interface gap, and further comprising a connector with a first end open to the interface gap and a second end fluidically coupled to the intake of the vacuum pump.

15. The display system of claim 14, further comprising elongated guards positioned adjacent inner edges of each of the front frame members, wherein the elongated guards apply a retention force against an outer side of the sheet of flexible optical material adjacent the outer edge to provide a second seal limiting air flow into the gap when the vacuum pump is not pumping air out of the interface gap.

16. A display system with a selectable screen finish, comprising:
   an optical element with an exterior surface;
   a film positioned over the exterior surface;
   a retention frame supporting the optical element and retaining outer edges of the optical film against the exterior surface with an inner side of the film facing the exterior surface; and
   a vacuum unit coupled with a gap between the inner side of the film and the exterior surface of the optical element,
   wherein the vacuum unit operates to pump gas out of the gap to draw a vacuum on the gap,
   wherein the retention frame comprises a port providing a fluid passageway to the gap,
   wherein the vacuum unit includes an intake coupled to the port in the retention frame,
   wherein the retention frame further comprises at least three additional ports spaced apart from the port and each providing a fluid passageway to the gap, and
   wherein the intake of the vacuum unit is coupled to the at least three additional ports.

17. The display system of claim 16, wherein the film comprises an aperture extending from the inner side to an outer side and wherein the port extends through the aperture and a substantially airtight seal is provided about a periphery of the aperture.

18. The display system of claim 16, wherein the optical element comprises a video monitor and wherein the exterior surface includes a surface of a screen of the video monitor, wherein the flexible optical material comprises the sheet of flexible optical material comprises an anti-reflective film, and wherein the anti-reflective film comprises a sheet of rear projection (RP) screen material.

19. The display system of claim 16, wherein the vacuum unit is operated on an ongoing basis to retain the vacuum on the gap, wherein the retention frame further comprises a plurality of elongated guards applying an additional retention force to an outer side of the film opposite the inner side along and adjacent to the outer edges retained by the retention frame, whereby when the vacuum unit is not operating to provide the vacuum on the gap the elongated guards force the inner side of the film against the exterior surface of the optical element to retain the selectable screen finish.

20. A display system with a selectable screen finish, comprising:
   an optical element with an exterior surface;
   an optical film positioned over the exterior surface and formed of a sheet of flexible optical material;
   a retention frame supporting the optical element and retaining outer edges of the optical film against the exterior surface with an inner side of the optical film facing the exterior surface; and
   a vacuum unit in fluidic communication with a gap between the inner side of the optical film and the exterior surface of the optical element,
   wherein the vacuum unit operates to pump gas out of the gap to draw a vacuum on the gap,
   wherein the retention frame includes a rear retention member and a front retention member,
   wherein the optical element and the optical film are sandwiched between the rear and front retention members,
   wherein the retention frame further comprises a sealing member formed of resilient material that is positioned between inner side of the optical film proximate adjacent the outer edges and the exterior surface of the optical element, and
   wherein the sealing member is compressed from an at rest state to block flow of gas into the gap from the surrounding environment.

21. The display system of claim 20, wherein the optical element comprises a video monitor, wherein the exterior surface includes a surface of a screen of the video monitor, and wherein the flexible optical material comprises the sheet of flexible optical material comprises an anti-reflective film.

22. The display system of claim 21, wherein the anti-reflective film comprises a sheet of rear projection (RP) screen material.

23. The display system of claim 20, wherein the retention frame further comprises a plurality of elongated guards applying an additional retention force to an outer side of the optical film opposite the inner side along and adjacent to the outer edges retained by the retention frame, whereby when the vacuum unit is not operating to provide the vacuum on the gap the elongated guards force the inner side of the optical film against the exterior surface of the optical element to retain the selectable screen finish.

24. A display system with a selectable screen finish, comprising:
   an optical element with an exterior surface;
   a film positioned over the exterior surface;
   a retention frame supporting the optical element and retaining outer edges of the optical film against the exterior surface with an inner side of the film facing the exterior surface; and
   a vacuum unit coupled with a gap between the inner side of the film and the exterior surface of the optical element,
   wherein the vacuum unit operates to pump gas out of the gap to draw a vacuum on the gap,
   wherein the retention frame comprises a port providing a fluid passageway to the gap,
   wherein the vacuum unit includes an intake coupled to the port in the retention frame,
   wherein the vacuum unit is operated on an ongoing basis to retain the vacuum on the gap, and
   wherein the retention frame further comprises a plurality of elongated guards applying an additional retention force to an outer side of the film opposite the inner side along and adjacent to the outer edges retained by the retention frame, whereby when the vacuum unit is not operating to provide the vacuum on the gap the elongated guards force the inner side of the film against the exterior surface of the optical element to retain the selectable screen finish.

25. The display system of claim 24, wherein the film comprises an aperture extending from the inner side to an outer side and wherein the port extends through the aperture and a substantially airtight seal is provided about a periphery of the aperture.

26. The display system of claim 24, wherein the optical element comprises a video monitor and wherein the exterior surface includes a surface of a screen of the video monitor, wherein the flexible optical material comprises the sheet of flexible optical material comprises an anti-reflective film, and wherein the anti-reflective film comprises a sheet of rear projection (RP) screen material.

* * * * *